L. DE FLOREZ.
NEGATIVE FILM ROLL FOR PHOTOGRAPHIC CAMERAS.
APPLICATION FILED JUNE 13, 1916.
1,249,602.  Patented Dec. 11, 1917.
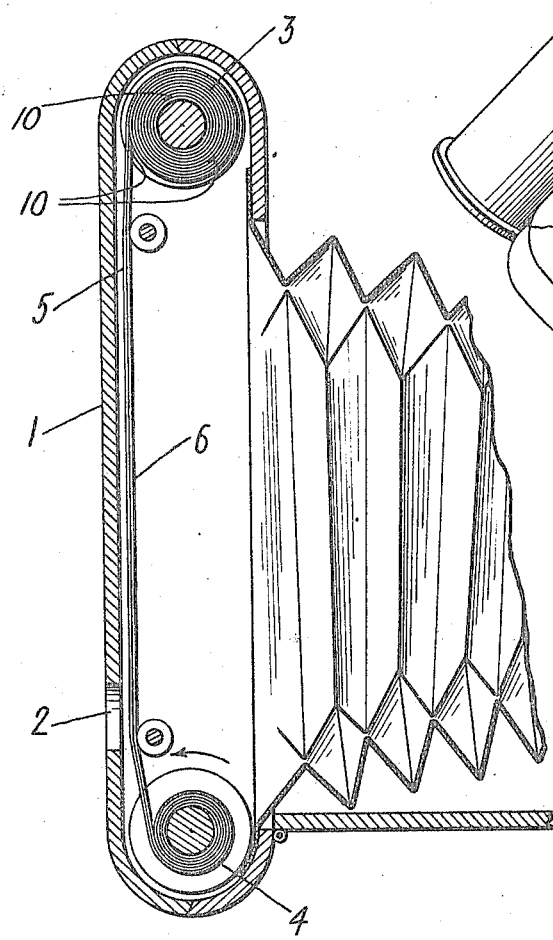
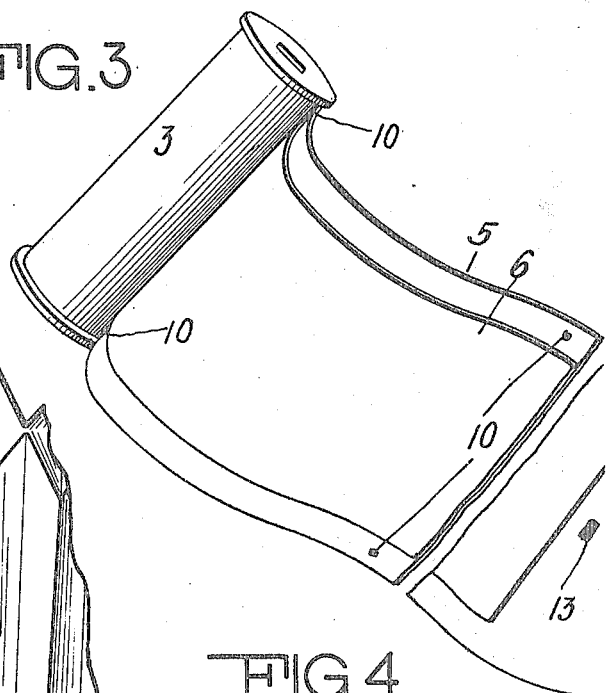
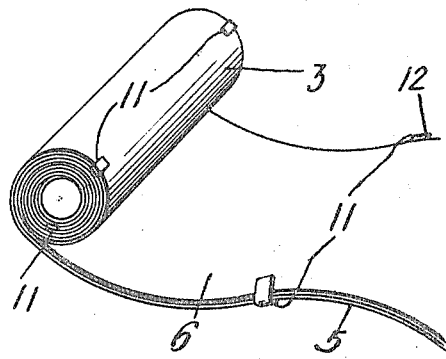
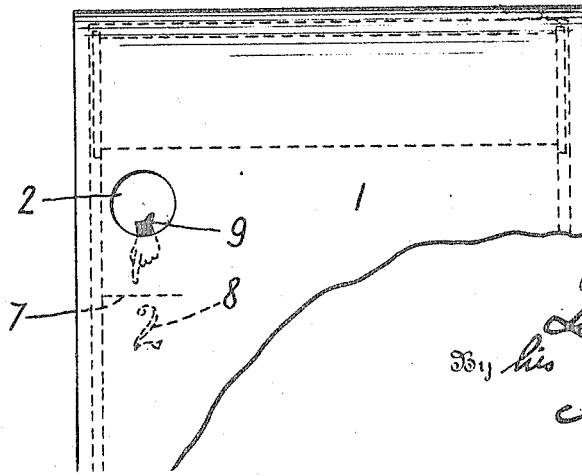
Inventor
Luis de Florez
By his Attorney
Clifford E. Dunn

UNITED STATES PATENT OFFICE.

LUIS DE FLOREZ, OF SHORT HILLS, NEW JERSEY.

NEGATIVE-FILM ROLL FOR PHOTOGRAPHIC CAMERAS.

1,249,602.  Specification of Letters Patent.  Patented Dec. 11, 1917.

Application filed June 13, 1916. Serial No. 103,418.

*To all whom it may concern:*

Be it known that I, LUIS DE FLOREZ, a citizen of the United States, residing at Short Hills, in the county of Union and State of New Jersey, have invented certain new and useful Improvements in Negative-Film Rolls for Photographic Cameras, of which the following is a specification.

My present invention relates to that type of photographic films, generally known as "daylight rolls", which as heretofore constructed and employed, are provided with opaque protective ribbons, bearing film section or position marks properly spaced to indicate as they appear opposite the observation window of the camera during the unwinding of the film, the proper exposure position of each section of the film. Unless special attention is given by the user of the movement of the film, from an exposed section to an unexposed section there exists the liability of overlapping the exposures of adjacent sections or overrunning unexposed portions of the film, resulting in economic loss.

The object of my invention is to avoid this possibility by providing means for applying a sufficient resistance to the travel of the film during its manipulation so as to indicate to the operator the proper positioning of each section. In use each designated section of the film roll embodying my invention may be unrolled with the usual facility so as to bring it into proper position and when so positioned further movement thereof is resisted slightly to show and warn the user that he has completed the necessary movement thereof.

A further object of my invention is to indicate to the user when the film is beginning to unwind from the roll, so as to give warning that the first section is approaching exposure position.

The principles of my invention may be practised in divers ways, certain practical embodiments thereof being illustrated in the accompanying drawings forming part of this specification, in which like parts are represented by common reference numbers and in which:—

Figure 1 shows one form of my invention in use, in connection with so much of a camera being shown in vertical cross-section as is thought necessary to convey a clear understanding of the practical use of the invention.

Fig. 2 is a fragmentary plan view of the lower portion of the camera in which the observation window is located, and showing in dotted outline the opaque protective ribbon which surrounds the film as well as the spool upon which it is wound after being exposed.

Fig. 3 is a view in perspective of the film roll partly unwound to more clearly illustrate the embodiment of the invention shown in Fig. 1.

Fig. 4 is a diagrammatic view in perspective of a modification.

I have illustrated a folding camera in which the film may be used. This camera is of a rectangular outline, having rounded ends adjacent and within which are accommodated the film roll and an empty spool upon which the film is wound after being exposed. This camera is provided with a removable door 1, to provide an opening through which the film roll may be inserted or removed, this door being provided with an observation or sight window 2 past which the film and its protective ribbon travel when being wound from the full to the empty spool. The film roll is indicated at 3, while the empty spool is indicated at 4. In Fig. 1, the winding of the film upon the empty spool is shown as having been started, an unexposed section of the film being properly positioned to receive its exposure. The usual opaque protective ribbon is indicated by the numeral 5, while the film is indicated by the numeral 6. This opaque protective ribbon is generally provided upon its back with spaced film section marks 7, as well as spaced indicating numerals 8 and ofttimes with a warning mark in the form of a hand or arrow, 9. The indicating numerals and warning symbols are located near one margin of the protective ribbon and in alinement with the observation window 2, so that the operator can observe the movement of the film when passing from an exposed to an unexposed area and thereby control this movement in order to properly space the sectional areas for the pictures to be taken. In order to inform the operator of the approach of the marginal extremity of an exposed section to its proper position so as to prevent the inadvertent overrunning of the film and the passage of the indicating numeral or indicia beyond the observation window, I provide means for temporarily joining the adjacent convolutions of the roll of protective ribbon near their marginal edges so that when the predetermined amount of film has been unrolled, which will be accomplished freely, extra power will have to be applied in order to continue the unwinding operation. In this way, the user will be notified, even though he fails to observe the indicating numerals through the observation window, that the proper section of the film has been brought into its proper exposure position. Referring to Fig. 3, the means I employ for accomplishing this desirable result is by applying an adhesive substance 10, to the marginal edges of the inner surfaces of the opaque protective ribbon just outside of the marginal edges of the film, at proper spaced intervals. It will be obvious that as the film is being unwound these pasted zones of adjacent convoluted layers of the wound ribbon will offer a marked and appreciable resistance to the hand of the operator, which resistance will have to be overcome by additional power before the unwinding operation can continue. This resistance, of course, is regulated by the character and extent of the applied adhesive and for ordinary purposes need be just sufficient to indicate to the user that the proper amount of unwinding has been accomplished to properly position the film, so that by the application of slight additional power the seal thus formed will be broken and the protective ribbon separated at this point to enable the succeeding unexposed section of the film to be advanced into proper exposure position. Thus, the operator need not rely entirely upon sight to observe whether or not the film is being properly spaced as the warning thus given will enable him to judge through the sense of feeling that a proper feed of the film has taken place. It will be understood that the adhesive 10 is to be applied to the inside of the protective ribbon at the marginal edges thereof at proper points when the rolls are being wrapped or wound upon the spools; therefore as the rolling takes place this adhesive will contact with the marginal edges of the outside surface of the immediately preceding wound convolutions and thus separably unite the two in the temporary manner described.

In lieu of the adhesive 10, and in instances where the film and the opaque protective ribbon are of the same width, I may temporarily unite the adjacent convolutions of the opaque protective ribbon by the application of thin strips of paper, as shown at 11 in Fig. 4. Where separate strips are used, the free ends of such strips of paper are secured to the adjacent convoluted portions of the ribbon, so that when the ribbon is being unwound with the film, the paper will be torn or separated at the top as at 12, so as to release the ribbon and permit the further unwinding thereof.

In practising this form of the invention, one end of the paper seal will first be applied to the outer surface of the ribbon with the free end thereof projecting outwardly, as shown in Fig. 4. The free end of the seal is bent over during the winding of the ribbon and inwardly so as to overlap the film and to the outer surface of the bent-in portion is applied a coating of adhesive. The continued winding of the ribbon will cause the free end of the seal to adhere to the adjacent preceding convolution of the ribbon and in this way the two adjacent convolutions thereof are temporarily joined together to be separated when the film is being unwound in use. The temporary binder will be easily severed as the film itself is of a tough and tenacious character and possesses a cutting edge which is of service in this connection.

As the protective ribbon is generally of considerably greater length than the film itself, in order to make effective its use in daylight loading, it is of advantage to provide means for indicating to the user that he has accomplished the unwinding of the fore-runner portion of the ribbon and is beginning the unwinding of the film proper, so that he will thus be advised of the approach of the first exposure section of the same and will be on his guard. For the accomplishment of this desirable feature, I apply an adhesive 13 to the inside of the ribbon at a point adjacent to the secured end of the film, which will adhere to the adjacent convolution of the ribbon and constitute a separable connection therewith. The operation of this feature of the invention is similar to that previously described. The runner of the film may be freely moved until this point of connection is reached during the unwinding, then it halts in its movement until additional power is applied to sever the connection and thus warn the user.

While I have illustrated certain preferred embodiments of my invention, I do so by way of example only, as other expedients may be employed to equal advantage without departing from the spirit and scope of the invention as set forth in the appended claims, which are intended to cover the principle of my invention broadly.

Having thus described my invention what I claim as new and desire to secure by Letters Patent, is:

1. A roll film having a suitable strip of opaque protective ribbon, provided at the back of the film and extending laterally beyond the edges thereof, said extended parts of the ribbon being temporarily joined together at spaced intervals for the purpose described.

2. A roll film having an opaque protective ribbon, provided at the back of the film with numeral section indicia, the adjacent convolutions of the roll of protective ribbon being temporarily joined together at spaced intervals which bear a fixed relation to the numeral section indicia.

3. A roll film having an opaque protective ribbon provided at the back with spaced film section marks and spaced indicating indicia between the film marks, said film roll having the convolution of the opaque protective ribbon separably joined together by an adhesive at spaced intervals, which intervals bear fixed relation to the position of the indicating indicia.

4. A roll film adapted for use with the winding mechanism of a camera, an opaque ribbon provided at the back of said film and bearing section indicia properly spaced, the convolutions of said ribbon being intermediately temporarily joined, the points of connection being separable by exerting an increased force upon the winding mechanism in the unwinding of the film as the section indicia passes in view, whereby the operator will automatically be given a signal upon the passing of an exposed and the approach of an unexposed portion of the film.

LUIS DE FLOREZ.